Oct. 4, 1955
L. WARDELL ET AL
2,719,484
INK FEEDING DEVICE
Filed Oct. 1, 1952
4 Sheets-Sheet 1
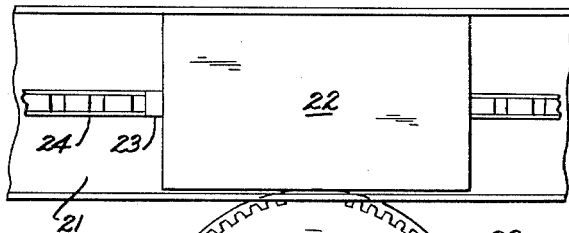
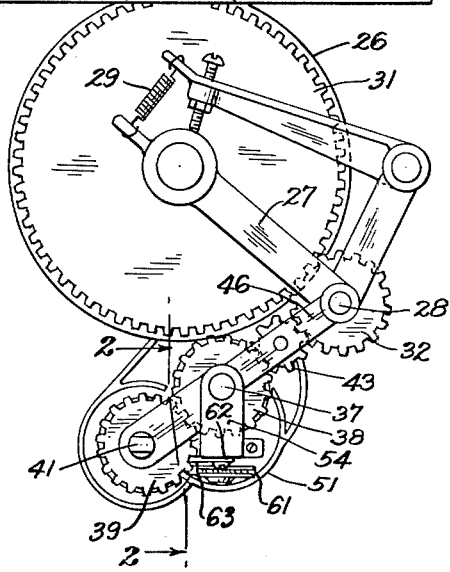
Fig. 1.
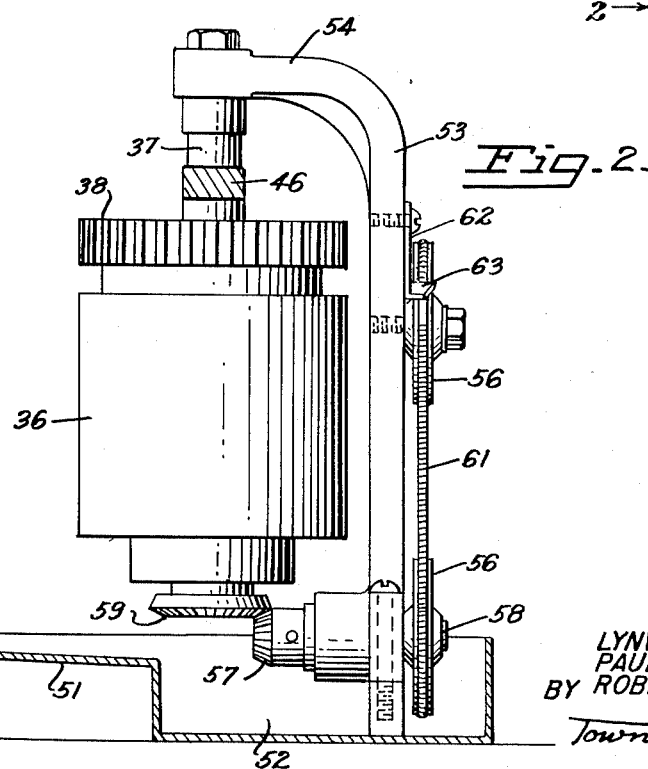
Fig. 2.
INVENTORS
LYNWOOD WARDELL
PAUL F. LEAVITT
BY ROBERT F. KRUPP
Townsend and Townsend
ATTORNEYS Oct. 4, 1955    L. WARDELL ET AL    2,719,484
INK FEEDING DEVICE
Filed Oct. 1, 1952    4 Sheets-Sheet 2
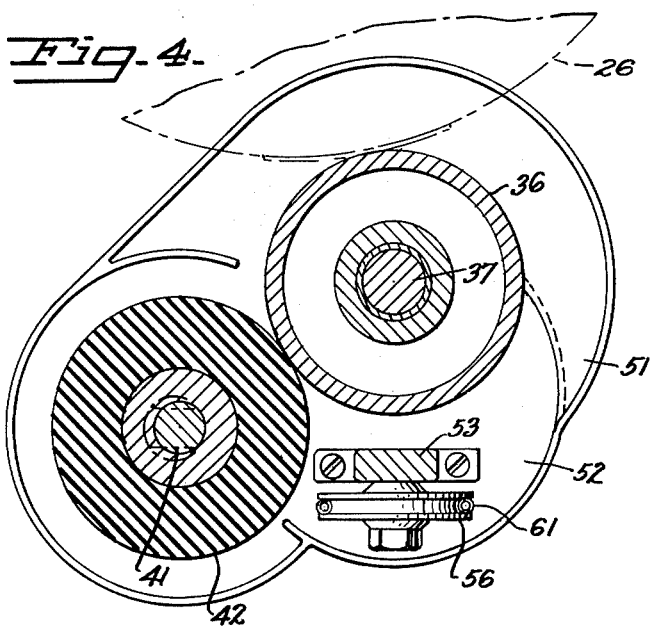
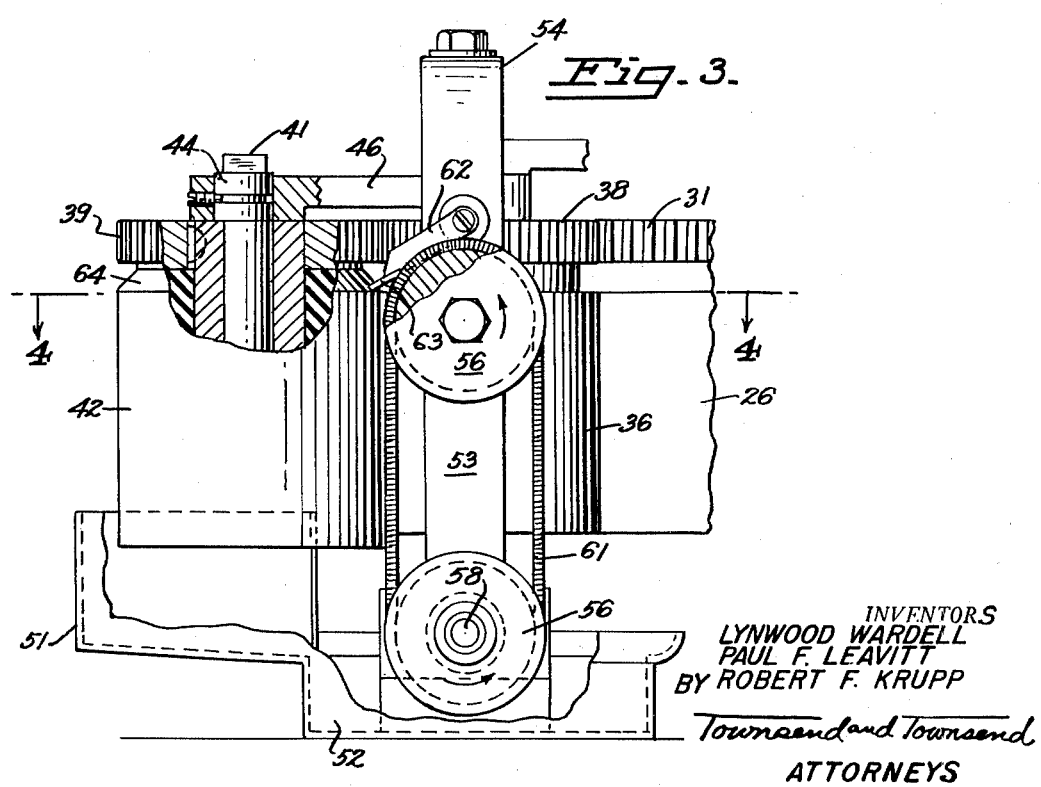
INVENTORS
LYNWOOD WARDELL
PAUL F. LEAVITT
BY ROBERT F. KRUPP
Townsend and Townsend
ATTORNEYS

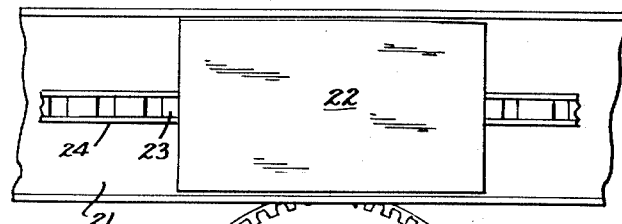
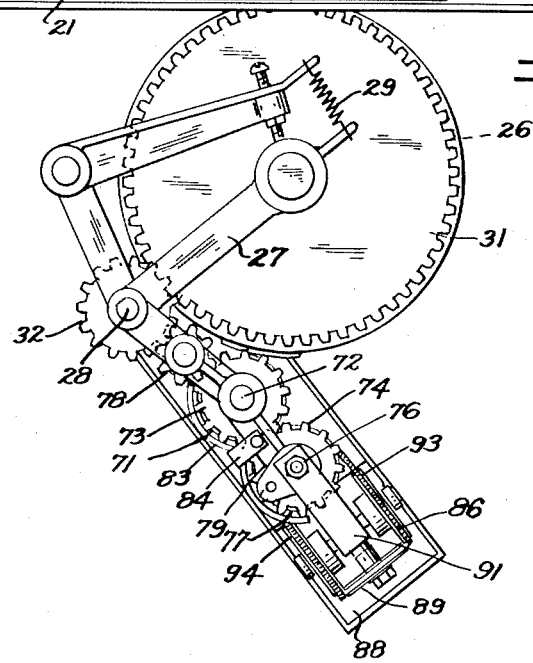
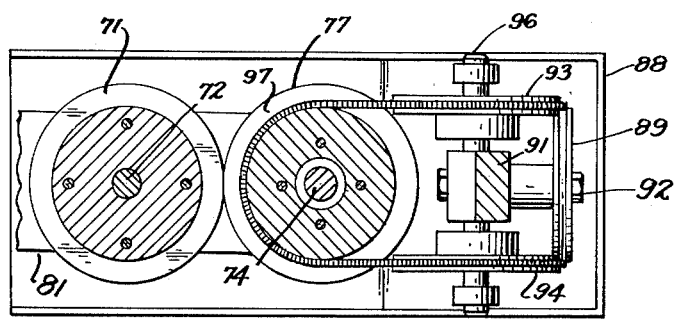

Oct. 4, 1955
L. WARDELL ET AL
2,719,484
INK FEEDING DEVICE
Filed Oct. 1, 1952
4 Sheets—Sheet 4
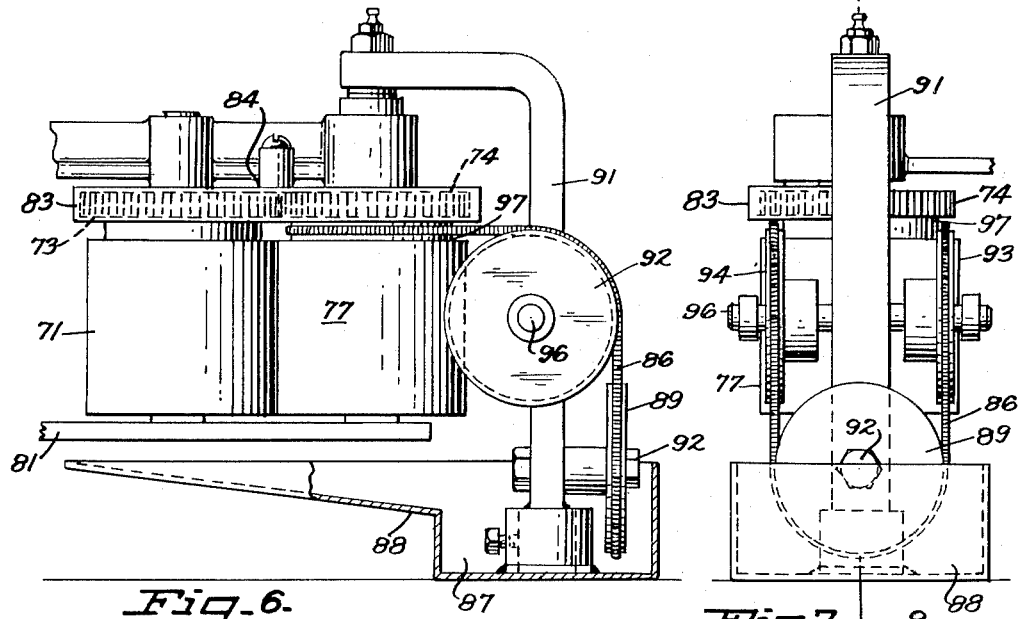
Fig. 6.
Fig. 7.
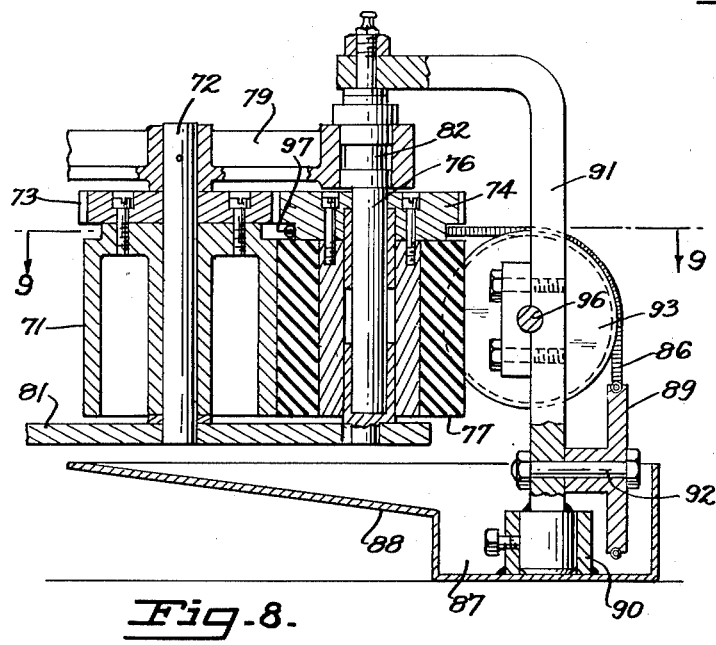
Fig. 8.
INVENTORS
LYNWOOD WARDELL
PAUL F. LEAVITT
BY ROBERT F. KRUPP
Townsend and Townsend
ATTORNEYS

United States Patent Office 2,719,484
Patented Oct. 4, 1955

2,719,484
INK FEEDING DEVICE

Lynwood Wardell, Livermore, and Paul F. Leavitt and Robert F. Krupp, San Lorenzo, Calif., assignors to Gerber Products Company, Fremont, Mich., a corporation of Michigan Application October 1, 1952, Serial No. 312,448

4 Claims. (Cl. 101—363)

This invention relates to new and useful feed mechanism for feeding ink onto vertical printing rolls. The invention is further characterized in that it comprises a feed mechanism for transferring ink from a well to printing type mounted on a cylindrical platen which revolves about a vertical shaft.

The present invention has particular application in applying designating markings to cartons for canned goods and the like, wherein a container is advanced along a horizontal conveyor past a wheel which carries rubber type which marks the carton. Thus, where a variety of different types of canned goods is packed in cartons, the contents of the cartons may be identified by printing on the side thereof the type of product enclosed. Ink is applied to the type face by contact with an inked steel roll, the ink being transmitted to the steel roll from a rubber roll.

A variety of different methods have been employed heretofore to apply ink to the type face. One such method has been to employ an attendant to brush or spray ink manually onto the rubber roll; this method has the disadvantage of requiring the hire of the attendant, and it further results in lack of uniformity in the density of the resulting printing. Other methods which have been employed heretofore have involved use of various types of pumps which pump ink from a well onto the exterior of the rubber roll or into the hollow interior of a sponge rubber roll. Such pumps break down and the passageways thereof tend to clog easily. Repair of the pumps is time consuming and requires shutting down the packing line. Still another means of applying ink to the type is by means of a wheel which rotates about on a horizontal axis and dips ink from a well at the bottom of its cycle and rubs it directly across the face of the type at the top of its cycle. This method has the disanvantage of wearing the type face rapidly.

The present invention employs a spring-type metal belt which is reeved about pulleys so that the belt at the bottom of its cycle passes through the inkwell and at the top of the cycle is adjacent the surface of a rubber roller which transfers ink to another roller as hereinafter described in greater detail.

One of the principal objects and advantages of the type of ink feeder which is the subject of this invention is the accessibility and ease of cleaning of the parts. Further, little or no maintenance is required in that there are no passageways, valves, tubes, and the like which require cleaning or which may clog if the machine is temporarily shut down.

Still another advantage of this invention is that a solid, molded rubber transfer roll may be employed, thereby replacing the composite sponge rubber rolls which have heretofore been employed with internal pump feeders. The sponge rubber rolls harden and become less resilient as the ink dries therein and hence the efficiency of the ink transfer mechanism greatly diminishes with time.

Other objects of the present invention will become apparent upon reading the following specification and referring to the accompanying drawings in which similar characters of reference represent corresponding parts in each of the several views.

In the drawings:

Fig. 1 is a top plan of a portion of a conveyor line for cartons and adjacent printing mechanism showing one form of inking mechanism installed.

Fig. 2 is an elevation of the inking mechanism as viewed along the line 2—2 of Fig. 1.

Fig. 3 is an elevation of the inking mechanism partially broken away in section.

Fig. 4 is a horizontal section taken along the line 4—4 of Fig. 3.

Fig. 5 is a top plan of a conveyor line for cartons and adjacent printing mechanism showing a modified form of inking mechanism.

Fig. 6 is a side elevation of said modified inking mechanism, partially broken away in section.

Fig. 7 is an end elevation of the structure of Fig. 6.

Fig. 8 is a vertical section taken substantially along the line 8—8 of Fig. 7.

Fig. 9 is a horizontal section taken substantially along the line 9—9 of Fig. 8.

In the modification shown in Figs. 1 to 4, there is provided a conveyor line 21 along which conventional canned goods cartons 22 are propelled by means of lugs 23 on an endless chain 24, said chain being driven by a motor (not shown). At the printing station there is provided a wheel 26 having a vertical axis of rotation, said wheel having type affixed to its periphery which may be changed as required to indicate the contents of the cartons passing the inking station at any given time. The type marks one side of the carton as it passes the inking station. Wheel 26 is mounted on an arm 27 which pivots about a vertical shaft 28, said arm 27 being biased by spring 29 toward engagement with the cartons 22. Customarily a similar wheel 26 is mounted on the opposite side of the conveyor line 21 to print the opposite sides of the cartons. Said wheel 26 has affixed to its upper end a large gear 31, said gear meshing with a pinion 32 on vertical shaft 28 which is rotated in timed relation to movement of chain 24.

The present invention relates to means for applying ink to the type face on said wheel 26, it being understood that the foregoing described mechanism is subject to considerable variation in details of construction. Accordingly, in the modification of Figs. 1 to 4, there is provided a roll 36, having a steel external surface, which is positioned with its axis vertical so that the type face contacts and receives ink from the inked surface of the steel roll as wheel 26 revolves. Gear 38 is fastened to steel roll 36, both of which revolve on vertical shaft 37. Gear 38 meshes with gear 39 on shaft 41 of rubber roll 42, gear 39 meshing with an idler 43 which in turn meshes with pinion 32 which rotates wheel 26. This gear train insures positive and correct directional rotation of the rubber type, the steel wheel 36 and the rubber roll 42 so that no abrasive action occurs between any of said parts. The upper end of rubber roller shaft 41 is formed with an offset eccentric 44 which is received in bracket 46, which is mounted stationary. By adjustment of the shaft 41 of rubber roll 42 by means of its eccentric mounting, the closeness of contact of said rubber roll 42 with the steel roll 36 may be adjusted and thus the thickness of the ink coating transmitted from the rubber roll to the steel roll may be adjusted.

Below the rollers is an horizontally disposed pan 51 which catches the ink drippings and said pan has a well 52 in its bottom in which the ink collects. A vertical bracket 53 extends up from said well, said bracket having a horizontal arm 54 at its upper end which attaches to the upper end of shaft 36. Mounted on the vertical stretch of said bracket 53 is a pair of pulleys 56 having horizontal axes, the lowermost of said pulleys 56 having a beveled gear 57 mounted on its shaft 58, said beveled gear 57 meshing with the beveled gear 59 mounted on the lower end of steel roll 36.

A steel, coiled-spring belt 61 is reeved over the two pulleys 56 and said belt is moved around the pulleys upon rotation of the steel roll 36. It will be noted that the lower stretch of belt 61 extends into the ink well 52 and thus as the belt moves, ink is carried up on the surface of belt 61 over the top pulley 56. A scraper 62 is mounted on bracket 53, said scraper having a blade 63 which is disposed at an angle to the horizontal and which engages the upper surface of belt 61 and scrapes ink off the surface of the belt, said ink flowing down blade 63 by gravity and thence on to the beveled upper edge 64 of the rubber roll 42. From the upper edge 64 the ink flows down over the cylindrical surface of the rubber roll 42 so as to thoroughly ink the same. The ink is carried around by the rubber roll 42 and transferred to steel roll 36, adjustment of the rubber roll against the steel roller by means of eccentric 44 governing the amount of ink which is transferred to the steel roll relative to the amount which is squeezed into the pan 51 beneath said rolls.

In the operation, cartons 22 of canned goods are transported along conveyor 21 by lugs 23 on a chain 24, wheel 26 revolving in timed relation so that the type face carried on said wheel contacts the cartons at the proper position to stamp thereon indicia of the contents. Said wheel 26 is caused to revolve by the same motor which moves chain 24 and by means of a gear train the steel roll 36 which contacts the type face on wheel 26 is also caused to revolve. Ink is fed up by belt 61 from the well 52 at the bottom of pan 51 under the inking mechanism and scraped off by blade 63 onto the bevelled upper edge 64 of roll 42, flowing down over roll 42 and then being squeezed off the rubber roll and on to the surface of the steel roll 36.

It will thus be seen that there is provided by mechanism hereinbefore described an ink transfer mechanism to apply ink to the type face of the cylinder 26 revolving about a vertical axis. The ink transfer mechanism is characterized by its simplicity and low cost of manufacture and further by the accessibility of all of its moving parts for cleaning and adjustment. The fact that no tubes or valves are required eliminates clogging of the ink with the passage of time or when the machine is shut down temporarily. Another feature of the invention is the use of a hard-walled, molded rubber jacket for the transfer roll 42, thus replacing the customary sponge rubber rolls heretofore employed in inking devices of this general character.

In the modification shown in Figs. 5 to 9 inclusive, there is provided a conveyor line 21 along which conventional canned goods cartons 22 are propelled by means of lugs 23 on an endless chain 24, as in the preceding modification. At the printing station there is provided a printing wheel or cylinder 26 having a vertical axis of rotation, said cylinder having removable type affixed to its periphery, as has been described. Cylinder 26 is mounted on a horizontal arm 27 which pivots about a vertical shaft 28, arm 27 being biased by spring 29 toward engagement with cartons 22 as they pass along the conveyor line 21. A large gear 31 is fixed for rotation with wheel 26, and said gear meshes with a driving pinion 32 on vertical shaft 28 which is rotated in timed relation to the movement of the conveyor.

In the modification of Figs. 5 to 9 inclusive, there is provided a roll 71 having a steel external surface which is mounted on a vertical shaft 72 so that the type face on cylinder 26 contacts and receives ink from the inked surface of the steel roll 71. Steel roll 71 carries a gear 73 which meshes with gear 74, mounted on rubber roll 77 and supported by vertical shaft 76. Idler 78 meshes both with gear 31 and gear 73 and thus drives both the printing cylinder 26, steel roll 71 and rubber roll 77. Shafts 72 and 76 are supported at their tops by horizontal arm 79 and at their bottoms in a horizontally disposed plate 81 which provides a bearing surface to maintain the shafts 72 and 76 vertical. The upper end of rubber roll shaft 76 is formed with an offset eccentric 82, which is received in arm 79. By adjustment of shaft 76 by means of its eccentric mounting, the closeness of contact of the rubber roll 77 with the steel roll 71 may be adjusted and thus the thickness of the ink coating transmitted from the rubber roll to the steel roll may be adjusted. Guard 83 around gears 73 and 74 depending from bracket 84 is suspended from arm 79.

As has been stated, pinion 32 causes rotation of rubber roll 77 and this rotative motion also drives the coil spring belt 86 which is similar to belt 61 of the preceding modification. The belt 86 at its lower stretch is immersed in inkwell 87 in the bottom of ink pan 88 which is positioned under rolls 71 and 77. Belt 81 passes under grooved pulley 89 which is rotatively mounted near the bottom of L-shaped bracket 91 on a horizontal axis 92 so that the bottom of pulley 89 is immersed in ink in well 87. Bracket 91 extends up from a socket 90 in well 87 in a vertical stretch and then bends horizontally to provide an upper mounting to the top of shaft 76 of rubber roll 77. Two additional grooved pulleys 93 and 94 are rotatively mounted on a horizontal axis 96 on bracket 91, axis 96 being transverse to axis 92 of the bottom pulley 89 and pulleys 93 and 94 being spaced apart a distance equal to the diameter of pulley 89. The tops of pulleys 93 and 94 are at the same elevation as the top of rubber roll 77 and above said roll a peripheral groove 97 is formed in the supporting structure of roll 77 below gear 74, this groove 97 constituting, in effect, a fourth pulley. Belt 86 thus passes under bottom pulley 89, thence vertically upward on either side thereof and over pulleys 93 and 94 and thence horizontally around groove 97.

The modification of Figs. 5–9 operates as follows:

As the conveyor 21 advances, printing cylinder 26 is rotated and at the same time steel roller 71 and rubber roller 77 are revolved. Ink is entrapped and drawn up upon movement of belt 86 from the bottom of well 87 and along the top edge of the rubber roller 77, whence it runs down over the surface of the rubber roller. The ink is transferred from rubber roller 77 to the steel roll 71 which is in contact with the type on cylinder 26, thereby inking the cylinder and in turn printing cartons 22 passing along the conveyor.

Although the present invention has been described in some detail by way of illustration and example for purposes of clarity of understanding, it is understood that certain changes and modifications may be made within the spirit of the invention and scope of the appended claims.

What is claimed is:

1. Inking apparatus comprising a vertical axis ink roll, a horizontal first pulley on said roll above the upper edge of the inking surface, an ink pan horizontally disposed below said roll, a well in said pan, a bracket extending up from said well, a second pulley having a horizontal axis rotatably mounted on said bracket with its lower portion adjacent said well, third and fourth pulleys having a horizontal axis transverse to that of said second pulley rotatably mounted on said bracket above said second pulley and having their top edges substantially at the level of said first pulley, a thin, coil spring belt reeved around said pulleys to convey ink up from said well around the top edge of said roll to flow down by gravity over the surface of said roll, and means for driving said belt.

2. Apparatus according to claim 1 in which said third and fourth pulleys have a common horizontal axis of rotation and are spaced apart a distance substantially equal to the diameter of said second pulley.

3. Apparatus according to claim 1 in which said bracket is of an inverted L-shape, said second pulley being mounted adjacent the bottom of the vertical leg of said L, said third and fourth pulleys being mounted adjacent the top of the vertical leg of said L, and in which the upper end of said roll is rotatably mounted in the horizontal leg of said L.

4. Inking apparatus comprising a vertical axis ink roll, a horizontal first pulley on said roll above the upper edge of the inking surface, an ink pan disposed below said roll, a second pulley having a horizontal axis rotatably mounted with its lower portion adjacent said pan, third and fourth pulleys having a horizontal axis transverse to that of said second pulley rotatably mounted above said second pulley and having their top edges substantially at the level of said first pulley, means mounting said roll and pulleys, a thin, coil spring belt reeved around said pulleys to convey ink up from said well around the top edge of said roll to flow down by gravity over the surface of said roll, and means for driving said belt.

References Cited in the file of this patent

UNITED STATES PATENTS

| | | |
|---|---|---|
| 86,263 | Wells | Jan. 26, 1869 |
| 106,834 | Kraft | Aug. 30, 1870 |
| 555,626 | Storm | Mar. 3, 1896 |
| 769,499 | Sheetz | Sept. 6, 1904 |
| 930,465 | Fowler | Aug. 10, 1909 |
| 1,190,640 | Graham | July 11, 1916 |
| 1,763,395 | Frederick | June 10, 1930 |
| 1,799,086 | Caretta | Mar. 31, 1931 |
| 1,801,935 | Pfister | Apr. 21, 1931 |

FOREIGN PATENTS

| | | |
|---|---|---|
| 201,081 | Great Britain | July 26, 1923 |